United States Patent [19]
Overbergh et al.

[11] Patent Number: 5,482,087
[45] Date of Patent: Jan. 9, 1996

[54] METHOD OF ENVIRONMENTALLY PROTECTING A PIPELINE

[75] Inventors: Noel M. M. Overbergh, Rotselaar; Yvo Leest, Binkom, both of Belgium

[73] Assignee: N.V. Raychem S.A., Kessel-Lo, Belgium

[21] Appl. No.: 167,921

[22] PCT Filed: Jun. 11, 1992

[86] PCT No.: PCT/GB92/01049

§ 371 Date: Dec. 21, 1993

§ 102(e) Date: Dec. 21, 1993

[87] PCT Pub. No.: WO93/00014

PCT Pub. Date: Jan. 7, 1993

[30] Foreign Application Priority Data

Jun. 24, 1991 [GB] United Kingdom ............ 9113563

[51] Int. Cl.⁶ ..................................... F16L 59/16
[52] U.S. Cl. .................. 138/110; 138/99; 138/103; 285/381 R; 174/DIG. 8; 428/34.9
[58] Field of Search .................... 138/103, 110, 138/177, 178, 99; 156/86; 174/DIG. 8; 285/381; 428/34.9, 35.1

[56] References Cited

U.S. PATENT DOCUMENTS

| | | |
|---|---|---|
| 2,027,962 | 1/1936 | Currie . |
| 3,086,242 | 4/1963 | Cook et al. . |
| 3,539,411 | 11/1970 | Heslop et al. .............. 156/86 |
| 3,597,372 | 8/1971 | Cook ............................ 260/4 |
| 3,610,291 | 10/1971 | Heslop et al. .............. 138/146 |
| 3,669,824 | 6/1972 | Hess ............................ 161/166 |
| 3,744,823 | 7/1973 | Muir et al. ................... 285/381 |
| 4,521,470 | 6/1985 | Overbergh et al. ........ 174/DIG. 8 |
| 4,624,720 | 11/1986 | Pithouse et al. ............ 174/DIG. 8 |
| 4,631,098 | 12/1986 | Pithouse et al. ............ 156/86 |
| 4,732,412 | 3/1988 | van der Linden et al. ... 156/86 |
| 4,732,632 | 3/1988 | Pieslak et al. .............. 156/86 |
| 4,761,194 | 8/1988 | Pithouse et al. ............ 156/86 |
| 4,896,904 | 6/1990 | Gadsden et al. ........... 285/381 |
| 4,940,820 | 7/1990 | Pithouse et al. ............ 428/34.9 |
| 4,965,320 | 10/1990 | Overbergh ................. 138/DIG. 1 |
| 5,116,354 | 5/1992 | van Beersel ............... 285/381 |
| 5,252,155 | 10/1993 | Nowicki et al. ............ 156/86 |

FOREIGN PATENT DOCUMENTS

| | | |
|---|---|---|
| 0079702 | 5/1983 | European Pat. Off. . |
| 0116393 | 8/1984 | European Pat. Off. . |
| 0330480 | 8/1989 | European Pat. Off. . |
| 1529286 | 5/1968 | France . |
| WO03346 | 8/1984 | WIPO .................... 285/381 |
| WO09372 | 5/1993 | WIPO .................... 285/381 |

OTHER PUBLICATIONS

Search Report for International Application PCT/GB92/01049, Aug. 12, 1992.
Search Report for British Application No. 9113563.2, Jul. 31, 1991.

*Primary Examiner*—James E. Bryant, III
*Attorney, Agent, or Firm*—Marguerite E. Gerstner; Herbert G. Burkard

[57] ABSTRACT

A method of covering a joint between pipelines comprises installing a heat recoverable polymer sheet coated on its inner surface with a hot-melt adhesive comprising a mixture of 25 to 40 parts by weight of a polyethylene alkyl acrylate terpolymer containing maleic anhydride and having a melt flow index as determined according to ASTM D1238-70 of at least 40, and 25 to 70 parts by weight of a polyethylene alkyl acrylate copolymer having a melt flow index as determined according to ASTM D1238-70 of at least 40.

18 Claims, 1 Drawing Sheet

METHOD OF ENVIRONMENTALLY PROTECTING A PIPELINE

BACKGROUND OF THE INVENTION

1. Field of the Invention

The present invention relates to coverings for pipelines, and in particular to coverings which comprise a heat recoverable sheet or tape coated on its inner surface with a hot-melt adhesive comprising a blend of polyethylene alkyl acrylates, particularly for covering pre-polymeric coated or thermally insulated pipelines, or where the heat recoverable backing is a tape, for helically wrapping around bare metal pipe, or polymeric coating of a thermally insulated pipe.

2. Introduction to the Invention

Heat recoverable articles are well known. They are articles the dimensional configuration of which may be made substantially to change when subjected to heat treatment.

Usually these articles recover, on heating, towards an original shape from which they have previously been deformed but the term "heat recoverable" as used herein, also includes an article, which, on heating, adopts a new configuration, even if it has not been previously deformed. Examples of such heat recoverable articles based on polymeric sheet material are found in U.S. Pat. Nos. 2,027,962, 3,086,242, and 3,597,372. Heat recoverable articles based on fabrics are also known. Typically these comprise a recoverable fabric in conjunction with a polymeric matrix formed by laminating a polymeric material to one or both sides of the fabric to render it impervious. Examples are described in European Patent Publication Nos. 116,393, 117,026, and 116,392.

The use of a polyethylene alkyl acrylate on a heat recoverable sleeve for environmental protection, particularly of a cable splice, is described in European Patent Publication No. 330,480, which is the counterpart of U.S. Pat. No. 4,965,320. The entire disclosure of U.S. Pat. No. 4,965,320 is incorporated herein by reference.

SUMMARY OF THE INVENTION

The present invention provides particular methods of applying a recoverable sheet or tape coated with the specified hot-melt adhesive around pipelines.

A first aspect of the invention provides a method of environmentally protecting a polymer-coated metal pipeline, or a joint between two such pipelines where the pipelines have been bared of polymer coating at the joint region, the method comprising:

(i) positioning a heat recoverable sheet which is coated on one surface thereof with a hot melt adhesive composition, such that the adhesive faces the pipeline, and such that the adhesive-coated sheet at least overlaps the polymer coating, the adhesive comprising a mixture of 25 to 40 parts by weight of a polyethylene alkyl acrylate terpolymer containing maleic anhydride and having a melt flow index as determined according to ASTM D1238-70 of at least 40, and 25 to 70 parts by weight of a polyethylene alkyl acrylate copolymer having a melt flow index as determined according to ASTM D1238-70 of at least 40; and (ii) applying sufficient heat to recover the sheet and to activate the adhesive.

DETAILED DESCRIPTION OF THE INVENTION

The heat-recoverable sheet which is preferably shrinkable may be tubular, i.e. of closed cross-section, or may be wraparound, that is it may be in the form of a sheet wrapped around the pipelines, such that longitudinal edges thereof abut or overlap. The longitudinal edges may be held in position relative to each by any of a number of known closure mechanisms, e.g. a polymeric patch may be bonded to overlapped edges of the wraparound, or a penetrating closure e.g. stitching or riveting, can be used, or the overlapped edges may simply be bonded or fused to each other.

One particular application of the first aspect of the present invention is for covering a joint, e.g. a weld between two metal pipes coated with a corrosion protection layer. As an example steel or other metal pipes are often pre-coated in the factory with a polyethylene coating. This coating may be so-called "three-layer-PE coating". The polyethylene coating is typically extruded. As another example a coating comprising sintered polyethylene maybe used. In order to join such pipes they are usually bared of coating at their ends, and then welded. In order to protect the joint it is therefore necessary to make good the coating in the joint region.

A number of solutions to the above problem have been suggested, including the application of a heat shrinkable sheet precoated with a heat-activatable adhesive.

For any heat-activatable adhesives there is generally a range of so-called "service temperatures" specified. This range defines the temperatures between which the adhesive retains its adhesive bonding power. At higher temperatures, it will have insufficient viscosity to maintain the bond under the influence of the external (mainly shear and creep) forces that are exerted by the pipeline environment, and at lower temperatures it may become brittle. Typical heat-activatable adhesive, e.g. polyethylene copolymer based adhesives, typically, require the metal pipes to be heated at least 60° C. above the maximum service temperature specified in order properly to activate them. In this context the maximum service temperature is defined as the highest temperature at which the adhesive maintains its bond to the substrate and does not show onset of movement when subjected to a static shear creep force of 2.50–2.75 N/cm². Where the adhesive is to be applied on a sheet to a metal pipeline, this practically means that significant pre-heat needs to be applied to the pipeline in order to activate the adhesive. Indeed in some cases, e.g. where the pipelines is acting as a significant heat sink, e.g. if carrying fluid such as oil, it may not be possible to reach the activation temperature at all. Preheating of pipelines is typically achieved by applying a gas-torch for several minutes. This is both time consuming and difficult, particularly if in constrained surroundings. Also where the pipeline is precoated with a polymer coating this may be damaged by the pre-heating. We have found that the particular adhesive used in the present invention is particularly advantageous for applying to pipelines since it may be activated by heating the pipeline to temperatures of at most 40° C., or even at most 35° C. or 30° C. above the specified maximum service temperature (as hereinbefore defined), i.e. to lower temperatures than used hitherto. This substantially reduces the amount of preheating needed, and reduces time and minimises possible damage to any existing polymeric coating on the pipelines.

Thus where the invention according to the first aspect of the invention is used to protect a joint between two such coated pipelines bared of coating in the welded joint region, the sheet is positioned to cover the join and to overlap the remaining coating on either side of the join. The relatively low temperature needed to activate the adhesive (compared, for example, to polyethylene copolymer based hot-melt adhesives) means that the adhesive coated sleeve can be applied without damage to the pre-existing polymer coating on either side of the join.

In a similar way, according to the first aspect of the invention, the adhesive coated sheet can be installed over an individual pre-coated pipeline, rather than over a joint. This may be desirable, for example, to repair damage such as a hole in the polymer coating.

Similarly the method according to the first aspect of the invention can be used to protect thermally insulated pipelines, such as district heating pipelines, or joints therebetween. Such pipelines are typically metal, e.g. steel, with a thick polyurethane coating and an outer polyethylene jacket.

This invention is also concerned with covering and protecting bare pipelines.

A second aspect of the present invention provides a method of covering (a) a bare metal pipeline, or (b) a polymer coated pipeline, or a joint between such pipelines where the pipelines have been bared of insulation in the joint region, the method comprising (i) helically wrapping a heat recoverable tape around the pipeline or insulation, the tape being coated on the inward facing surface with an adhesive comprising a mixture of 25 to 40 parts by weight of a polyethylene alkyl acrylate terpolymer containing maleic anhydride and having a melt flow index as determined according to ASTM D1238-70 of at least 40, and 25 to 70 parts by weight of a polyethylene alkyl acrylate copolymer having a melt flow index as determined according to ASTM D1238-70 of at least 40; and (ii) applying heat to recover the tape into close conformity with the pipeline and to activate the adhesive.

The tape is preferably heat shrinkable. It may be applied as before to pre-polymer coated pipelines, e.g. polyethylene coated pipelines, or thermally insulated pipelines, or to joints therebetween. As before the advantages of relatively low activation temperature, and consequent minimizing of damage to the preexisting coating is apparent. Alternatively the tape may be applied to bare pipe, e.g. to bare metal pipeline such as steel. Where it is applied directly to bare pipeline there is the advantage that it reduces the amount of preheat required. Indeed in some cases, e.g. where the pipeline is carrying oil or other fluid and is acting as a significant heat sink the lower activation temperature makes it possible to achieve activation, and therefore to be able to use an adhesive bonded polymer backing system. With previous heat activatable adhesives, e.g. hot melt polyethylene copolymer based adhesives, it was not always possible to even reach activation in certain circumstances, e.g. where the pipeline was acting as a heatsink, and therefore other systems were devised, e.g. based on epoxy primer in combination with a heat shrinkable sleeve, for example as described in European Patent Publication No. 181,233, which is the counterpart of U.S. Pat. No. 4,732,632. The adhesive described in the present invention may be combined with the epoxy technology and heat shrinkable sleeve described in U.S. Pat. No. 4,732,632, the entire disclosure of which is incorporated herein by reference.

The tape may be helically wrapped so that the edges abut or overlap. Overlap may be any suitable amount, e.g. 10%, 20%, 50%.

A number of aspects are now described which are applicable to both the first and the second aspect of the invention.

The terpolymer (a) is preferably a terpolymer of ethylene, ethyl and/or butyl (preferably ethyl) acrylate and maleic anhydride; and the copolymer (b) is preferably a copolymer of ethylene and ethyl and/or butyl (preferably butyl) acrylate. Other alkyl acrylates, particularly lower (especially C1–6, typically C2–5) acrylates may, however, be used.

The copolymer (b) consists essentially of ethylene and one or more (preferably one) alkyl acrylate, there preferably being no third comonomer present. Any third comonomer is preferably present as less than 5 mole %, more preferably less than 2 mole %, especially less than 1 mole %. Similarly, the terpolymer preferably consists essentially of the three specified monomers, any fourth preferably being present as less than 5 mole %, more preferably less than 2 mole %, especially less than 1 mole %.

In the present invention the adhesive composition is supplied as a coating on a heat-recoverable article. The heat-recoverable article may comprise an extended continuum, or it may comprise a composite material, for example one shrinkable by virtue of a shrinkable fiber component thereof. Preferred composite materials comprise shrinkable fibers and a polyethylene matrix material to which the adhesive composition is bonded.

As mentioned above the composite or other recoverable article may be in the form of a tubular or wraparound sleeve or in the form of a tape.

The composition of the invention may additionally comprise a flow-temperature- or viscosity-modifying agent. Examples include tackifiers, waxes, modified waxes, polyisobutylene and that known by the Monsanto trade mark, Santicizer (e.g. N-ethyl o- and p-toluene sulphonamides) and equivalents. In general, ingredients that increase viscosity are preferably avoided. Furthermore, the composition is preferably not subjected to cross-linking, particularly if not irradiated. The term "tackifier" is used in the adhesives art to mean a material which when added to an adhesive promotes its adhesion to a substrate, by increasing its ability to wet the substrate. Examples of tackifiers include low molecular weight polymers of monomers that contain ethylenic unsaturation and are free of polar groups. Specific examples include Nevpene 9500 (trade mark) which is believed to be a copolymer of a mixture of aromatically- and aliphatically-substituted ethylene, and Piccotex 75 (trade mark of Industrial Chemical Corp.) which is believed to be a copolymer of vinyl toluene and alpha-methylstyrene. Preferred tackifiers, however, comprise terpene phenolic resins such as SP 553 (trade mark, Schenectady Corp.) and Nevillac Hard (trade mark of Neville), particularly the former. The tackifier preferably has a Brookfield viscosity at 160° C. of 80–1500 centipoises; a ring-and-ball softening point as determined according to ASTM E-28 of 50°–130° C. more preferably 80°–120° C., or preferably 110°–120° C., particularly about 115° C.; and a molecular weight of less than 3000.

Given the basic components of the composition of the invention, the skilled man after reading this specification will be able to choose a tackifier or other flow-temperature- or viscosity-modifying agent to achieve the desired properties, namely one or more of:

(a) a ring-and-ball softening point as determined according to ASTM E-28 of from 90°–110° C., preferably 95°–105° C.;

(b) a viscosity as determined according to ASTM D3236 at 160° C. of from 40–110 Pa.s., preferably 60–90 Pa.s.;

(c) a viscosity as determined according to ASTM D3236 at 200° C. of from 10–50 Pa.s, preferably 15–40 Pa.s., more preferably 20–35 Pa.s., and a viscosity as determined according to ASTM D3236 at 160° C. of from 40–110 Pa.s.

(d) an impact brittleness as determined according to ISO 974 of less than −30° C., preferably less than −35° C.; and (e) a peel strength to non-flame-brushed and/or flame-brushed polyethylene as determined according to DIN 30672 of greater than 30 N/cm, preferably greater than 40 N/cm, especially greater than 50 N/cm.

It has been found that all of these properties can be achieved using the above defined mixture of polyethylene alkyl acrylates, each of high melt flow index, together with from 5–15, preferably 10–15, parts by weight of SP 553 or equivalent as tackifier or other flow-temperature or viscosity-modifying agent. The use of alternative tackifiers or alternative quantities will in general allow chosen ones of the above properties to be achieved.

The preferred viscosity achieved, optionally with the addition of tackifiers, is particularly advantageous for achieving good flow and filling of any surface irregularities between the recoverable sheet or tape and the underlying pipe, or polymer coating on the pipe.

The adhesive used in the invention also has good high temperature performance, e.g. good peel strength even at high temperatures. This combination of appropriate viscosity and good performance at high service temperatures is a particular advantage of the present invention.

For some purposes it may be desirable to add small quantities of one or more polyamides to the mixture. A suitable polyamide is one having an amine number below 5, preferably below 4. For example up to 15 parts by weight of a polyamide may be added, although it has been found that satisfactory properties can be achieved at lower cost with less than 5 parts by weight of, and preferably substantially without, polyamide.

The adhesive used in the present invention preferably consists essentially of the terpolymer, the copolymer, a tackifier and optionally a polyamide. The adhesive composition preferably contains substantially no polyamide, and no vinyl acetate nor copolymer thereof.

It is also preferred that the polyethylene alkyl acrylate terpolymer has a melt flow index as defined of at least 70, more preferably from 100–300. This terpolymer may, for example, comprise: a terpolymer of ethylene; ethyl acrylate and/or butyl acrylate (preferably ethyl acrylate); and maleic anhydride. It preferably has a ring-and-ball softening point as determined according to ASTM E-28 of 80°–125° C., more preferably 95°–120° C. Its viscosity as determined according to ASTM D3236 at 160° C. is preferably from 120–140 Pa.s. Preferred terpolymers include that known by the trade mark Lotader 8200 (Orkem), and equivalents.

The polyethylene alkyl acrylate copolymer preferably has a melt flow index as defined of at least 70, more preferably 100–300. It preferably has a ring-and-ball softening point as determined according to ASTM E28 of 80°–125° C., more preferably 90°–115° C. Its viscosity as determined according to ASTM D3236 at 160° C. is preferably from 70–150 Pa.s. Preferred copolymers include polyethylene butyl acrylates such as that known by the trade mark Lotryl 8600 (Orkem), and equivalents, and polyethylene ethyl acrylates such as those known by the trade marks Alathon 704 (Dupont) and EA 89821 (USI), and equivalents.

The composition preferably has:

(a) 28–38 parts by weight of the polyethylene alkyl acrylate terpolymer; and (b) 55–70 parts by weight of said polyethylene alkyl acrylate copolymer.

It is also preferred that the composition consist essentially of the polyethylene alkyl (preferably ethyl) acrylate terpolymer, the polyethylene alkyl (preferably butyl) acrylate copolymer, the tackifier and optionally, the polyamide. Preferably any other component is present as less than 10 parts by weight, more preferably less than 5 parts by weight, especially less than 2 parts by weight. Examples of permissible minor components include stabilizers such as antioxidants, a preferred amount of which is about 1 part by weight. Another permissible minor component is carbon black. In particular the composition preferably contains substantially no vinyl acetate nor copolymer thereof.

BRIEF DESCRIPTION OF THE DRAWINGS

Embodiments of the present invention will now be described, by way of example, with reference to the accompanying drawings, wherein.

DETAILED DESCRIPTION OF THE DRAWINGS

Figure 1:
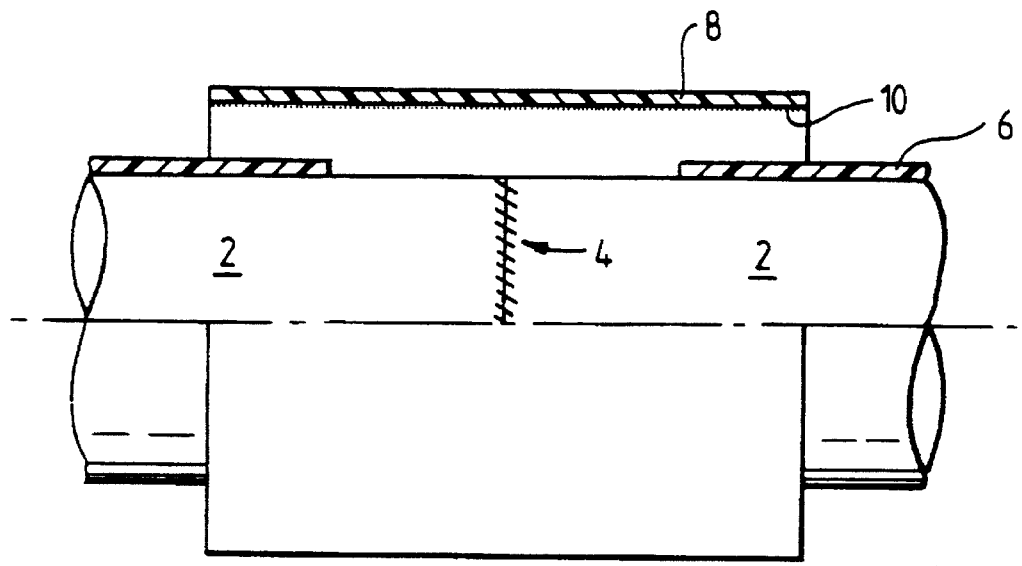
FIG. 1 shows reinsulation of a joint between two polymer coated pipelines bared of insulation in the joint region, using a method according to the invention.

Referring to the drawings. In FIG. 1, two steel pipelines are welded at 4. Each is coated with an extruded coating of polyethylene 6. The coating has been removed in the region of weld 4. The pipeline is preheated to a temperature about 40° C. higher than the maximum service temperature of the adhesive. A heat shrinkable sheet 8 (which may optionally be a heat recoverable fabric) coated with a heat-activatable adhesive 10 of the type described hereinbefore is then wrapped around the weld region. It covers the weld region and overlaps the polymer coating 5 on either side thereof. The wraparound sheet is closed by a patch closure (not shown). Heat is then applied, e.g. by a gas torch, to shrink the sheet 8. This heat, together with the pipeline pre-heating, activates the adhesive 10. When the sheet 8 shrinks and the adhesive 10 thereon initially contacts the preheated pipeline, the hot surface substantially prevents the adhesive 10 from crystallizing. Additional heat applied to shrink the sheet 8 raises the temperature of the adhesive 10 to make it fill and flow. Preferably the adhesive has a viscocity of about 1000 Pa.s. at 100° C., and a substantially lower viscosity of about 500 Pa.s. at 110° C., and 300 Pa.s. at 120° C. Thus as the sheet shrinks it can force the adhesive into any surface irregularities and fill any gaps between the sheet and the pipeline. The post-heat shrink configuration is not illustrated.

Similarly the sheet could be applied over a damaged coated pipeline rather than at a join. Also it could be applied over a thermally insulated pipe such as a district heating pipe or a joint therebetween.

Figure 2:
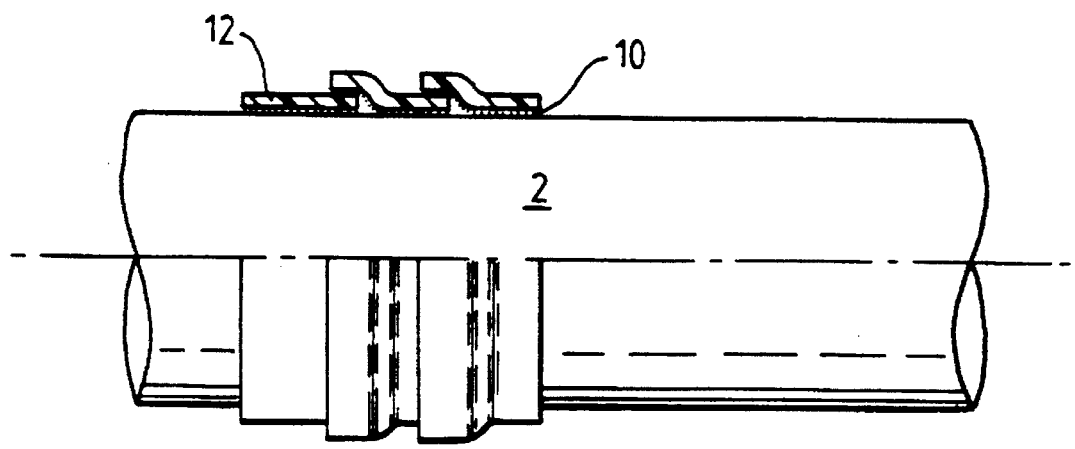
FIG. 2 shows application of a heat shrinkable tape to a bare pipeline using a method according to the invention.

FIG. 2 shows an alternative embodiment. In this case the adhesive 10 is provided on a tape 12. The pipeline is preheated as before, then the tape is helically wrapped around a metal pipeline 2 carrying oil (not illustrated). Adjacent turns of the tape overlap each other slightly. Heat applied to shrink the sleeve in combination with the preheat to the pipe activates the adhesive causing it to fill and flow. This is possible despite the flowing oil in the pipeline, which acts as a heat sink.

In a similar way a helically wrapped tape could be applied to a polymer coated pipeline, or a joint between two such pipelines, e.g. to a pipeline with a polyethylene coating, or to a district heating pipeline.

What is claimed is:

1. A method of environmentally protecting a polymer-coated metal pipeline, or a joint between two such pipelines where the pipelines have been bared of polymer coating at the joint region, the method comprising:

(i) positioning a heat recoverable sheet which is coated on one surface thereof with a hot melt adhesive composition, such that the adhesive faces the pipeline, and such that the adhesive-coated sheet at least overlaps the polymer coating, the adhesive (a) comprising a mixture of 25 to 40 parts by weight of a polyethylene alkyl acrylate terpolymer containing maleic anhydride and having a melt flow index as determined according to ASTM D1238-70 of at least 40, and 25 to 70 parts by weight of a polyethylene alkyl acrylate copolymer having a melt flow index as determined according to ASTM D1238-70 of at least 40, and (b) having a maximum service temperature at which the adhesive maintains a bond to a substrate and shows no movement when subjected to a static shear creep force of 2.50 to 2.75 N/cm$^2$; and (ii) heating the pipeline or joint to a temperature of at most 40° C. above the maximum service temperature of the adhesive, said temperature being sufficient to recover the sheet and to activate the adhesive.

2. A method of covering a bare metal pipeline, a polymer coated pipeline, or a joint between such pipelines where the pipelines have been bared of insulation in the joint region, the method comprising (i) helically wrapping a heat recoverable tape around the pipeline or insulation, the tape being coated on the inward facing surface with an adhesive which (a) comprises a mixture of 25 to 40 parts by weight of a polyethylene alkyl acrylate terpolymer containing maleic anhydride and having a melt flow index as determined according to ASTM D1238-70 of at least 40, and 25 to 70 parts by weight of a polyethylene alkyl acrylate copolymer having a melt flow index as determined according to ASTM D1238-70 of at least 40, and (b) has a maximum service temperature at which the adhesive maintains a bond to a substrate and shows no movement when subjected to a static shear creep force of 2.50 to 2.75 N/cm$^2$; and (ii) heating the pipeline or joint to a temperature of at most 40° C. above the maximum service temperature of the adhesive, said temperature being sufficient to recover the tape into close conformity with the pipeline, and to activate the adhesive.

3. A method according to claim 1, wherein the polymer coating on the metal pipeline is an extruded polyethylene coating, a mil coating of sintered polyethylene, or a thermally insulating layer of polyurethane.

4. A method according to claim 1 for covering a joint between two pipelines pre-coated with a polymer coating and bared of that coating in the joint region, wherein the sheet is positioned to cover the bared joint region, and to overlap the polymer coating on either side of the joint region.

5. A method according to claim 1, wherein the terpolymer of the adhesive composition comprises (i) a polyethylene ethyl acrylate terpolymer, (ii) a polyethylene butyl acrylate terpolymer, or (iii) a polyethylene ethyl acrylate terpolymer and a polyethylene butyl acrylate terpolymer.

6. A method according to claim 1, wherein the copolymer adhesive of the composition comprises (i) a polyethylene ethyl acrylate copolymer, (ii) a polyethylene butyl acrylate copolymer, or (iii) a polyethylene ethyl acrylate copolymer and a polyethylene butyl acrylate copolymer.

7. A method according to claim 1, wherein the terpolymer of the adhesive composition comprises a polyethylene ethyl acrylate terpolymer and the copolymer comprises a polyethylene butyl acrylate copolymer.

8. A method according to claim 1, wherein the heat recoverable sheet comprises a composite material that is shrinkable by virtue of a shrinkable fiber component thereof.

9. A method according to claim 3 wherein the polymer coating further comprises an outer jacket of polyethylene.

10. A method according to claim 2 wherein there is a polymer coating on the pipeline and the coating is an extruded polyethylene coating, a mil coating of sintered polyethylene, or a thermally insulating layer of polyurethane.

11. A method according to claim 2 for covering a joint between two pipelines wherein the tape is positioned to cover the bared joint region and to overlap the polymer coating on either side of the joint region.

12. A method according to claim 2, wherein the terpolymer of the adhesive composition comprises (i) a polyethylene ethyl acrylate terpolymer, (ii) a polyethylene butyl acrylate terpolymer, or (iii) a polyethylene ethyl acrylate terpolymer and a polyethylene butyl acrylate terpolymer.

13. A method according to claim 2, wherein the copolymer adhesive of the composition comprises (i) a polyethylene ethyl acrylate copolymer, (ii) a polyethylene butyl acrylate copolymer, or (iii) a polyethylene ethyl acrylate copolymer and a polyethylene butyl acrylate copolymer.

14. A method according to claim 2, wherein the terpolymer of the adhesive composition comprises a polyethylene ethyl acrylate terpolymer and the copolymer comprises a polyethylene butyl acrylate copolymer.

15. A method according to claim 2, wherein the heat recoverable tape comprises a composite material that is shrinkable by virtue of a shrinkable fiber component thereof.

16. A method according to claim 15, wherein the composite material comprises shrinkable fibers and a polyethylene matrix to which the adhesive composition is bonded.

17. A method according to claim 8, wherein the composite material comprises shrinkable fibers and a polyethylene matrix to which the adhesive composition is bonded.

18. A pipeline or joint between pipelines having a heat recovered sheet or helically wrapped tape adhered thereto by an adhesive (1) comprising a mixture of (i) 25 to 40 parts by weight of a polyethylene alkyl acrylate terpolymer containing maleic anhydride and having a melt flow index as determined according to ASTM D1238-70 of at least 40, and (ii) 25 to 70 parts by weight of a polyethylene alkyl acrylate copolymer having a melt flow index as determined according to ASTM D1238-70 of at least 40, and (2) having a maximum service temperature at which the adhesive maintains a bond to a substrate and shows no movement when subjected to a static shear creep force of 2.50 to 2.75 N/cm$^2$; wherein the sheet or tape was recovered and the adhesive was activated to bond it to the pipeline by heating the pipeline or joint to a temperature of at most 40° C. above the maximum service of the adhesive.

* * * * *

UNITED STATES PATENT AND TRADEMARK OFFICE

CERTIFICATE OF CORRECTION

PATENT NO. : 5,482,087

INVENTOR(S) : Overbergh et al.

DATED : January 9, 1996

It is certified that error appears in the above-identified patent and that said Letters Patent is hereby corrected as shown below:

On the title page:
    Item: [87], line 1, replace "WO93/00014" by --WO93/00214--.

Column 2, line 34, replace "adhesive" by --adhesives--.

Column 2, line 36, replace "typically," by --typically--.

Column 2, line 46, replace "pipelines" by --pipeline--.

Claim 18, line 16, after "service", insert --temperature--.

Signed and Sealed this

Twenty-first Day of May, 1996

*Attest:*

BRUCE LEHMAN

*Attesting Officer*      *Commissioner of Patents and Trademarks*